US009003785B2

(12) United States Patent
Toulouse (10) Patent No.: US 9,003,785 B2
(45) Date of Patent: Apr. 14, 2015

(54) INSTALLATION FOR CONVERTING HYDRAULIC ENERGY INTO MECHANICAL OR ELECTRICAL ENERGY

(75) Inventor: Paul Toulouse, Grenoble (FR)

(73) Assignee: Alstom Renewable Technologies, Grenoble (FR)

( * ) Notice: Subject to any disclaimer, the term of this patent is extended or adjusted under 35 U.S.C. 154(b) by 143 days.

(21) Appl. No.: 13/144,677

(22) PCT Filed: Jan. 22, 2010

(86) PCT No.: PCT/FR2010/050094
§ 371 (c)(1),
(2), (4) Date: Jul. 14, 2011

(87) PCT Pub. No.: WO2010/084288
PCT Pub. Date: Jul. 29, 2010

(65) Prior Publication Data
US 2011/0271675 A1    Nov. 10, 2011

(30) Foreign Application Priority Data

Jan. 23, 2009 (FR) ...................................... 09 50419
Jan. 23, 2009 (FR) ...................................... 09 50421

(51) Int. Cl.
*F16D 31/02*    (2006.01)
*F03B 17/02*    (2006.01)
(Continued)

(52) U.S. Cl.
CPC ........ *B01D 19/0042* (2013.01); *B01D 19/0036* (2013.01); *B01D 19/0063* (2013.01); *F03B 11/04* (2013.01); *F03B 13/06* (2013.01); *F05B 2240/97* (2013.01); *Y02E 10/22* (2013.01); *Y02E 10/226* (2013.01); *Y02E 60/17* (2013.01)

(58) Field of Classification Search
USPC ................ 60/639, 398, 495–496; 290/42, 53; 405/87, 103, 104; 210/155, 170.01, 210/170.09
See application file for complete search history.

(56) References Cited

U.S. PATENT DOCUMENTS 3,675,779 A * 7/1972 Grutsch et al. ............. 210/242.2
3,701,428 A * 10/1972 Lesh ........................ 210/170.08
(Continued)

FOREIGN PATENT DOCUMENTS

KR    2007 0102644 A    10/2007
WO    2007 112526 A1    10/2007
(Continued)

OTHER PUBLICATIONS

K-PION English by Machine Translation of KR 10 2007 0098974.*
(Continued)

*Primary Examiner* — Kenneth Bomberg
*Assistant Examiner* — Deming Wan
(74) *Attorney, Agent, or Firm* — Buchanan Ingersoll & Rooney PC (57) ABSTRACT

The invention relates to a facility for converting water power into mechanical or electrical energy, including at least one hydraulic turbine, a water reservoir (R), and a pipe (5) for supplying the turbine with water (E) from the water reservoir. The facility also includes a device (200) submerged in the water reservoir and suitable for imposing an ascending movement on a water flow ($E_0$) moving in the water reservoir (R) towards the opening (51) of the supply pipe (5), and a gas-collecting means (400), arranged above a portion (V200) of the device (200) in which the ascending movement of the water flow ($E_0$) takes place.

20 Claims, 5 Drawing Sheets

(51) Int. Cl.
　　　*F03B 13/10*　　　(2006.01)
　　　*F03B 13/12*　　　(2006.01)
　　　*B01D 33/00*　　　(2006.01)
　　　*B01D 35/00*　　　(2006.01)
　　　*E02B 5/08*　　　(2006.01)
　　　*E02B 15/00*　　　(2006.01)
　　　*C02F 1/00*　　　(2006.01)
　　　*H02P 9/04*　　　(2006.01)
　　　*B01D 19/00*　　　(2006.01)
　　　*F03B 11/04*　　　(2006.01)
　　　*F03B 13/06*　　　(2006.01)

(56) References Cited

U.S. PATENT DOCUMENTS

| | | | | |
|---|---|---|---|---|
| 4,826,427 | A | * | 5/1989 | Hyde .................... 431/202 |
| 5,005,724 | A | * | 4/1991 | Imhof .................... 220/222 |
| 5,091,315 | A | * | 2/1992 | McCarty et al. ........ 435/290.1 |
| 5,525,229 | A | * | 6/1996 | Shih ...................... 210/603 |
| 6,811,705 | B2 | * | 11/2004 | Puetter et al. ........... 210/703 |
| 7,468,133 | B1 | * | 12/2008 | Norton ................... 210/603 |
| 8,734,646 | B1 | * | 5/2014 | Schuh et al. ............ 210/602 |

FOREIGN PATENT DOCUMENTS

| | | |
|---|---|---|
| WO | 2008034205 A1 | 3/2008 |
| WO | 2008092216 A1 | 8/2008 |

OTHER PUBLICATIONS

Mitigation and Recovery of Methane Emissions from Tropical Hydroelectric Dams, Bambace et al, Energy 32 (2007) 1038-1046.*
"Mitigation and recovery of methane emissions from tropical hydro-electric dams", Bambace; Ramos L A W; Kima F M; Rosa I B T; R R; Energy, Pergamon Press, Oxford, GB, vol. 32, No. 6 Feb. 23, 2007, pp. 1038-1046 ISSN: 0360-5442 p. 1041-1043; figures 1-3.
The efficiency of an artificial weir in oxygenating and removing CH4 from water released by the Petit Saut hydoelectric dam (French Guiana); Richard S.; Gregoire A.; Gosse P.; Revue Des Sciences De L'Eau, Lavoisier Abonnements, Pris, FR, no. Special Issue SI, Jan. 1, 2005, pp. 127-141, XP009086482 ISSN: 0992-7158, whole document.
Office Action issued Feb. 8, 2014, by the Chilean Patent Office in corresponding Chilean Patent Application No. 2011-001770. (7 pages).
An English Translation of the Second Office Action issued on Dec. 3, 2013, by the State Intellectual Property Office , P.R. China, in corresponding Chinese Patent Application No. 201080005130.4. (13 pages).

* cited by examiner

INSTALLATION FOR CONVERTING HYDRAULIC ENERGY INTO MECHANICAL OR ELECTRICAL ENERGY

BACKGROUND OF THE INVENTION

1. Field of the Invention

The present invention relates to an installation for converting hydraulic energy into mechanical or electrical energy, such an installation including a hydraulic turbine designed to have a forced flow of water pass through it coming from an impoundment of water such as a dam reservoir or the like.

2. Brief Description of the Related Art

Under certain conditions, a hydroelectric dam can be a greenhouse gas source. For example, in a tropical environment, decomposition of organic matter that is of plant origin or of geological origin and that is immersed in the impoundment of water can give rise to formation of methane ($CH_4$), of carbon dioxide ($CO_2$), or of other gases. Such a phenomenon takes place, in particular, in impoundments of water bordered with forests or when the impoundment of water was created over a preexisting forest. The methane forms mainly in the zones of the reservoir that are poor in oxygen, i.e. in the vicinities of the bottom and of the stagnant regions along the shore of the reservoir. Carbon dioxide forms mainly at the surface. Methane has a greater greenhouse effect than carbon dioxide.

The gases formed in this way can be discharged into the atmosphere via various routes. They are emitted by diffusion and by bubbling, those phenomena being distributed over the entire surface of the impoundment of water and, in practice, being impossible to avoid. Those gases are thus also emitted at the turbines of the dam insofar as, on passing through the turbine, the water undergoes a large pressure drop. Prior to passing through the turbine, the water is at a high pressure that depends on the depth of the water intake of the feed duct in the impoundment of water, so that a large quantity of each gas can have been dissolved in the water. At the outlet of the turbine, the water is at a relatively low pressure, i.e. at a pressure close to atmospheric pressure, so that the water is less likely to contain dissolved gas. A relatively large quantity of methane and of other gases dissolved in the water can thus be released by bubbling due to the lowering of the pressure of the water resulting from it passing through the turbine(s) of a dam.

In certain installations, such as those known from the article entitled "Mitigation and recovery of methane emissions from tropical hydroelectric dams" by L. Bambace, F. Ramos, I. Lima and R. Rosa, published in Energy (vol. 32, No. 6), it is known that metal boxes can be installed in an impoundment of water in order to prevent the water close to the bottom from entering a feed duct of a turbine. That avoids degassing in the turbine but it does not make it possible to treat the water charged with gas that remains at the bottom of the impoundment. Additional systems independent of the metal boxes, with pumps and spray rotors, must be used in order to degas the water, which consumes energy and is complex to put in place and to operate.

SUMMARY OF THE INVENTION

An object of the invention is, more particularly, to remedy that problem by limiting the emission of greenhouse gases in hydraulic installations, such as dams, without disrupting operation of such installations.

To this end, the invention provides an installation for converting hydraulic energy into mechanical or electrical energy, said installation comprising at least one hydraulic turbine, an impoundment of water, and a feed duct for feeding the turbine with water coming from the impoundment of water. Said installation is characterized in that it further comprises:

- a device immersed in the impoundment of water and suitable for constraining a flow of water advancing inside the impoundment of water towards the mouth of the feed duct to flow in an upward movement; and
- gas collection means disposed over a portion of the device in which the upward movement of the flow of water takes place.

By means of the invention, the device makes it possible to cause the water flowing towards the feed duct to flow upwards, so that said water undergoes decompression conducive to releasing bubbles of the gases that it contains, such as methane. Those gases escape to the surface of the impoundment of water, in the vicinity of the device. The gas collection means then make it possible to recover the gases before they are dissipated into the atmosphere. The invention enables the water flowing towards the turbine(s) to have a dissolved gas content that is relatively small, so that the expansion that takes place when the forced flow passes through the turbine generates few gas bubbles at the outlet of the turbine.

In advantageous but non-essential aspects of the invention taken in any technically feasible combination, the installation may incorporate one or more of the following characteristics:

- The device comprises at least two panels disposed in the impoundment of water and co-operating to define between them a volume in which the upward movement of the flow of water takes place.
- A first panel chosen from among the two panels is situated upstream from the second panel, in the general direction of flow of the water inside the impoundment of water, and the first panel extends at some distance from the bottom of the impoundment of water, an inlet passage via which the flow of water can enter the upward-movement volume being provided between a bottom edge of the first panel and the bottom of the impoundment of water. Advantageously, the first panel projects from the surface of the water in the impoundment.
- The second panel extends to the bottom of the impoundment of water, and an outlet passage via which the flow of water can exit from the upward-movement volume is provided between a top edge of the second panel and the surface of the impoundment of water.
- The panels are stationary. In a variant, the panels are mounted to be vertically movable, at least in part, thereby making it possible to adapt operation of said panels to accommodate the height of water that can vary depending on the seasons.
- The gas collection means comprise a chamber formed by a concave structure that has its concave side facing towards a portion of the device, and that is open downwards.
- The concave structure is a structure floating on the surface of the impoundment of water; it may be disposed substantially over the upward-flow volume and over the top edge of the second panel.
- A discharge duct is provided for removing a flow of water downstream from the turbine, and at least one gas collection chamber is in fluid communication with the internal volume of said duct.
- At least one gas collection chamber is in fluid communication with a top zone of the internal volume of the duct in a substantially horizontal portion of the duct, while the chamber(s) is/are connected to the internal volume of the duct via one or more openings that are distributed parallel to a longitudinal axis of the substantially horizontal portion of the duct, and while the chamber is defined by a shell that is mounted on the top portion of a wall of the duct and that is connected thereto in leaktight manner.

The chamber is a single chamber and is connected to the internal volume of the duct via a plurality of openings.

A plurality of chambers are distributed over the length of the substantially horizontal portion of the duct, and each of them is connected via at least one opening to the internal volume of the duct.

A first ratio between firstly the distance, measured parallel to a central axis of the horizontal portion of the duct, between the axis of rotation of the wheel of the hydraulic turbine and the upstream edge of the upstream-most opening of the gas collection chamber, and secondly the diameter of the wheel is greater than 1, and in particular equal to 2, and a second ratio between firstly the distance, measured parallel to a central axis, between the axis of rotation of the wheel and the downstream edge of the downstream-most opening of the gas collection chamber, and secondly the diameter of the wheel is greater than 2, and in particular equal to 3, when the first ratio is equal to 1.

The chamber is connected via a duct to an optionally removable gas accumulation tank or to a treatment unit for treating the gases collected in the chamber.

The chamber is connected to means for removing or for treating the collected gas(es).

BRIEF DESCRIPTION OF THE DRAWINGS

The invention can be better understood and other advantages of the invention appear more clearly from the following description of embodiments of an installation that complies with the principle of the invention, the description being given merely by way of example and with reference to the accompanying drawings, in which.

DESCRIPTION OF THE PREFERRED EMBODIMENT

Figure 1:
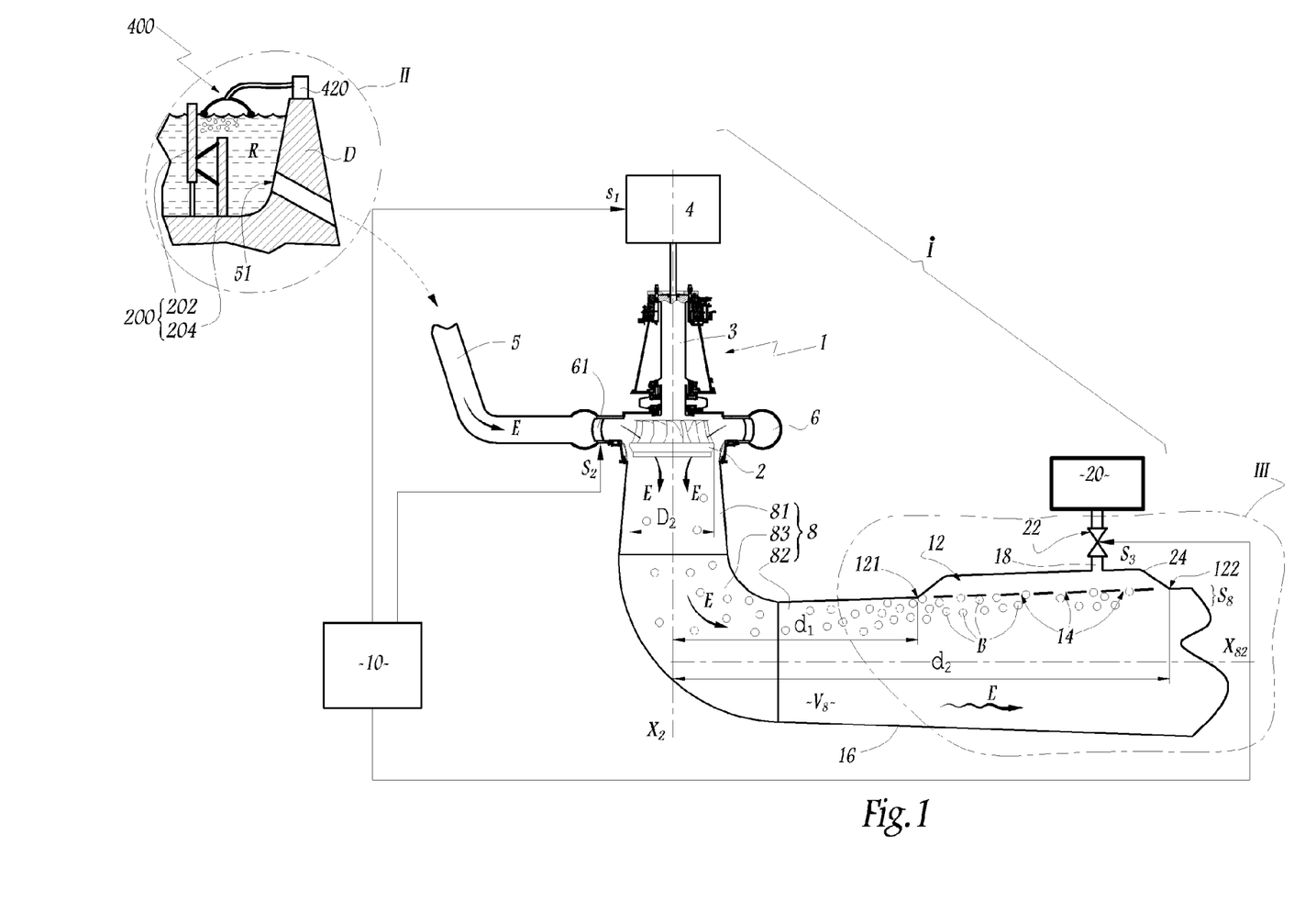
FIG. 1 is a diagrammatic view in axial section along the axis of rotation of the wheel of a turbine, showing the principle of an installation of the invention.
Figure 2:
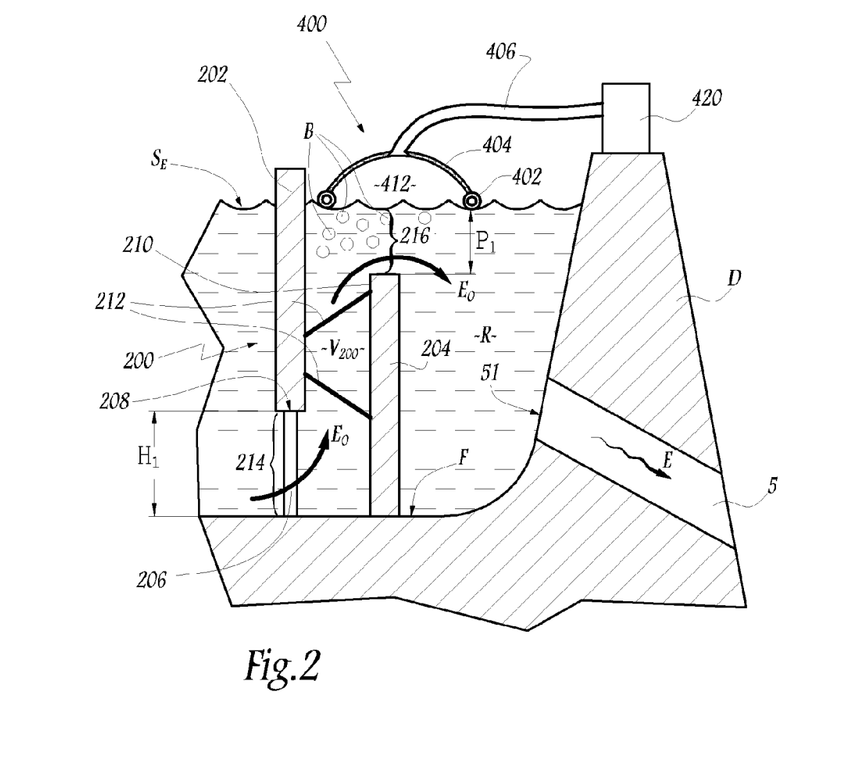
FIG. 2 is a view on a larger scale of the detail II of FIG. 1.

The installation I shown in FIGS. 1 and 2 includes a Francis turbine 1 having its wheel or "runner" 2 designed to be rotated about a vertical axis $X_2$ by a forced flow E coming from an impoundment of water R defined by a dam D. A shaft 3 mounted to rotate with the wheel 2 is coupled to an alternator 4 that delivers AC current to a network or grid (not shown) as a function of the rotation of the wheel 2. The installation I thus makes it possible to convert hydraulic energy from the flow E into electrical energy.

The installation I may include a plurality of turbines 1 fed from the impoundment of water R.

In a variant, the shaft 3 may be coupled to a mechanical assembly, in which case the installation I converts hydraulic energy from the flow E into mechanical energy.

A feed duct 5 makes it possible to bring the flow E to the wheel 2 and extends between the impoundment of water R and a casing 6 equipped with wicket gates 61 that make it possible to regulate the flow E.

A discharge duct 8 is provided downstream from the turbine 1 so as to remove the flow E and so as to return it to a river channel from which the impoundment R is formed.

A control unit 10 is provided for controlling the turbine 1 as a function, in particular, of the electricity needs of the network fed from the alternator 4. The unit 10 is capable of defining a plurality of points of operation of the installation I and of sending control signals $S_1$ and $S_2$ respectively to the alternator 4 and to the wicket gates 61.

A device 200 is immersed in the impoundment of water R so as to constrain the water flowing towards the mouth 51 of the duct 5 to flow in an upward movement. The flow of water in the impoundment of water R towards the mouth 51 is referenced $E_0$. This flow substantially takes place towards the dam D.

The device 200 includes a first panel 202 that extends over substantially the entire width of the impoundment of water R, i.e. the dimension of said impoundment of water that is parallel to the dam D. The device 200 also includes a second panel 204 that is substantially parallel to the first panel 202 and that also extends over substantially the entire width of the impoundment of water R.

Relative to the direction of flow of water in the impoundment of water R, the panel 202 is upstream from the panel 204.

When the impoundment of water R is of large width, each of the panels 202 and 204 may extend over a fraction only of the width of the impoundment of water, so long as all of the water that is to enter the duct 5 flows between said panels. To this end, partitions perpendicular to the dam D may be provided in order to isolate the mouth 51 from a portion of the impoundment of water R.

The panel 202 is supported by legs 206 that are uniformly spaced apart along the panel, so that the bottom edge 208 of the panel 202 extends at a non-zero height $H_1$ relative to the bottom F of the impoundment of water R. The heights of the legs 206 and of the panel 202 are chosen such that said panel projects from the surface $S_E$ of the water in the impoundment of water R.

The panel 204 stands on the bottom F and its top edge 210 is immersed in the impoundment of water R, at a depth $P_1$ that depends on the level of water in the impoundment R.

Bracing rods 212 are installed between the panels 202 and 204, thereby imparting good stability to the device 200.

The volume defined between the panels 202 and 204 is referenced $V_{200}$.

Since the panel 204 is in abutment against the bottom F of the impoundment of water R, the flow $E_0$ that is directed towards the mouth 51 of the duct 5 necessarily passes over the top edge 210 of the panel 204. To do so the flow $E_0$ necessarily has an upward movement in the volume $V_{200}$.

Since the panel 202 projects from the surface $S_E$, the flow $E_0$ necessarily passes under this panel and enters the volume $V_{200}$, where it necessarily has the above-mentioned upward movement.

The flow $E_0$ penetrates between the panels 202 and 204 by passing through a first passage 214 defined, in the height direction, between the edge 208 and the bottom F, and, in the width direction, between at least two of the legs 206. From the passage 214, the flow $E_0$ flows in an upward movement, inside the volume $V_{200}$, until it flows over into the downstream portion of the impoundment R, between the panel 204 and the dam D, so as to flow into the duct 5. This flow-over of the flow $E_0$ takes place through a passage 216 defined between the top edge 210 of the panel 204 and the surface $S_E$.

This upward movement of the flow $E_0$, inside the volume $V_{200}$ and towards the passage 216, is obtained without using a pump or any other equipment for causing water to move. It results from the natural flow of the water in the impoundment (R).

Due to the upward movement of the flow $E_0$ inside the volume $V_{200}$, the water constituting said flow is subjected to decreasing pressure. The water pressure is large in the vicinity of the bottom F, whereas it decreases considerably in the vicinity of the surface $S_E$, since said pressure is proportional to the depth of the water. Thus, the effect of the upward movement of the flow $E_0$ inside the volume $V_{200}$ is to decrease the pressure to which the flow $E_0$ is subjected, to the extent that bubbles B of methane or of other gases form in the flow $E_0$, in the vicinity of the surface $S_E$. In other words, the effect of forcing the flow $E_0$ to flow in a vertically upward movement inside the volume $V_{200}$ before entering the mouth 51 of the duct 5 is to release, by bubbling, the methane and the other gases present in said flow.

Means for collecting and recovering the bubbles of methane that are released in this way are provided in the form of a raft 400 floating on the surface $S_E$ and held stationary over the volume $V_{200}$ and over the panel 204. This raft 400 includes both a tube 402 for keeping it afloat, and a concave cover 404 having its concave side facing towards the surface $S_E$. Thus, bubbles B of methane and/or other gases that reach the surface of the impoundment of water R, within the zone bounded by the tube 402, can be recovered by a collection chamber 412 formed by the cover 404.

The cover 404 is connected via a flexible duct 406 to a tank 420 supported by the dam D and in which the gases recovered in the chamber 412 are stored. The tank 420 may be removable, so that it can be replaced when it is full.

In practice, the flow $E_0$ may include various gases and the bubbles B can be mixtures of different gases, these different gases being collected by the raft 400 and being brought to the tank 420.

The panels 202 and 204 may be made of metal, of concrete, or of a composite or synthetic material. They are held stationary inside of the impoundment of water R by means that are not shown, such as, for example, anchor blocks and/or struts bearing against the dam D.

Figure 3:
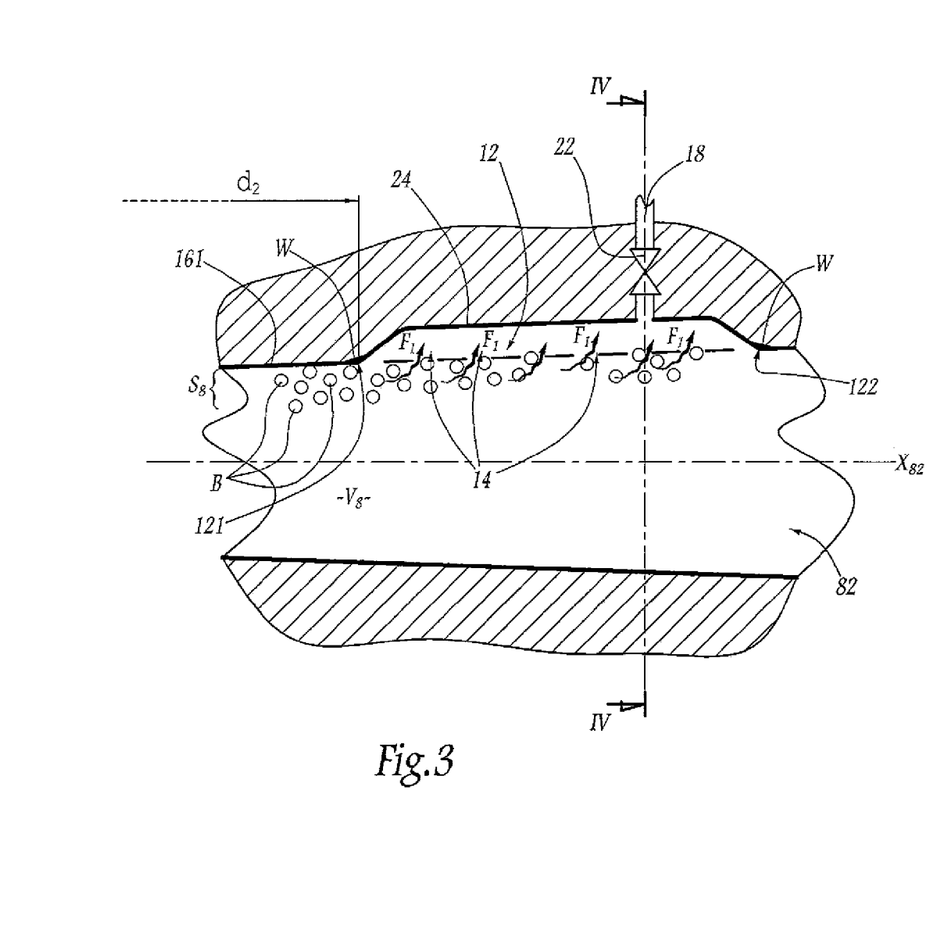
FIG. 3 is a view on a larger scale of the detail III of FIG. 1.

The duct 8 has an upstream portion 81 that is substantially vertical, frustoconical, and centered on the axis of rotation $X_2$ of the wheel 2. The duct 8 also has a downstream portion 82 centered on a substantially horizon axis $X_{82}$. In the meaning of the present application, the axis $X_{82}$ is substantially horizontal in that it forms an angle with a horizontal plane that is less than 20°. In practice, the axis $X_{82}$ may be inclined slightly upwards in the direction of the flow E. A 90° bend 83 interconnects the portions 81 and 82 of the duct 8. The magnitude of the angle formed by the bend 83 may be less than 90°. The internal volume of the duct 8 is referenced $V_8$.

A chamber 12 is provided over the portion 82 of the duct 8, and said chamber communicates with the volume $V_8$ by means of a plurality of openings 14 provided in the wall 16 of the duct 8, in the top portion of said wall. The openings 14 are distributed over the length of the portion 82, along the axis $X_{82}$.

Thus, when bubbles B of methane are formed in the flow E, at the outlet of the turbine 1, due to the pressure of said flow E decreasing resulting from the flow passing through the wheel 2, said bubbles migrate towards the top portion $S_8$ of the volume $V_8$ in its downstream portion 82, and pass through the openings 14, as indicated by the arrows $F_1$ in FIGS. 2 and 3, so that the chamber 12 collects a fraction of the gas present in the flow E.

The chamber 12 thus makes it possible to recover a substantial fraction of the methane released by the flow E, thereby preventing said methane from propagating to the atmosphere.

The chamber 12 is connected via a pipe 18 to a tank 20 in which the methane can be accumulated. A valve 22 makes it possible to control the flow of the methane from the chamber 12 towards the tank 20. The unit 10 controls the valve 22 by a signal $S_3$.

In practice, the chamber 12 makes it possible to collect the various different gases that are released due to the drop in pressure of the flow E in the turbine 1 and, whenever methane is mentioned below, it is to be understood also to include the other gases.

The tank 20 may be removable so that it can be replaced when it is full.

In place of a storage tank 20 for storing the gas(es) collected in the chamber 12, it is possible to provide a treatment unit for treating said gases, in order to make them less harmful relative to the ambient atmosphere. This unit may comprise a burner that makes it possible to generate heat energy.

Reference $d_1$ designates the distance, measured parallel to the axis $X_{82}$, between the axis $X_2$ and the upstream edge 121 of the chamber 12. Reference $d_2$ designates the distance, measured parallel to the axis $X_{82}$, between the axis $X_2$ and the downstream edge 122 of the chamber 12. The edges 121 and 122 respectively form the upstream edge of the opening 14 that is furthest upstream, and the downstream edge of the opening 14 that is furthest downstream. For an installation in which the wheel 2 has a diameter $D_2$ of about 5 meters, the distance $d_1$ is greater than 5 meters, and is preferably equal to about 10 meters, while the distance $d_2$ is greater than 10 meters, and is preferably equal to about 15 meters. It can be considered that the ratio $d_1/D_2$ is greater than 1, e.g. equal to 2, while the ratio $d_2/D_2$ is greater than 2, e.g. equal to 3 when $d_1/D_2$ is equal to 2. These values are given by way of indication and may be adapted to accommodate the configuration of the duct 8, in particular in the event of renovation of an existing dam.

Figure 4:
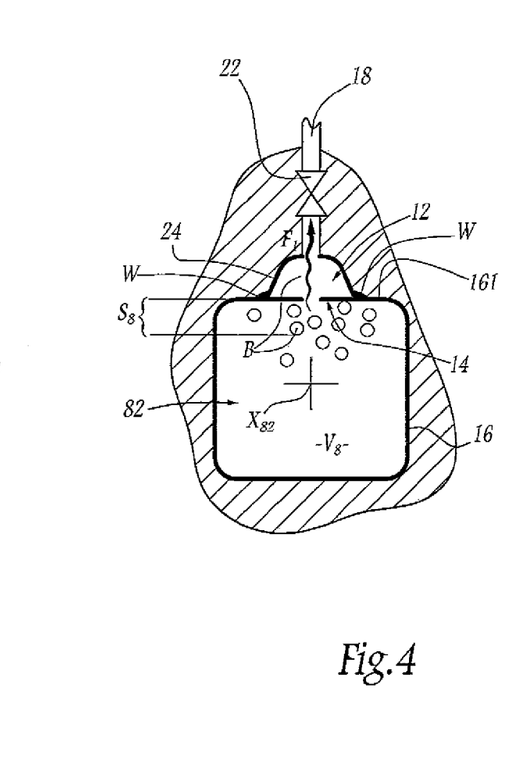
FIG. 4 is a section view on line IV-IV of FIG. 3.

The chamber 12 is defined be a shell 24 made of steel that is mounted on the top portion o161 of the wall 16 and is connected thereto in leaktight manner, e.g. by welding. The welds "W" are shown in FIGS. 3 and 4. The shell may be made of a material different from steel, in particular, of a synthetic material or of concrete.

The relatively simple construction of the assembly formed by the parts 18 to 24 makes it possible to consider altering existing installations in order to recover greenhouse gases, such as methane. Naturally, the installation may also be implemented with new installations.

In an embodiment of the invention that is not shown, the chamber 12 may be replaced with a plurality of individual chambers distributed along the portion 82 of the duct 8, each of which chambers is connected via one or more openings to the internal volume $V_8$ of the duct 8.

The chamber(s) 12 supplement(s) the action of the device 200 and of the raft 400 so as to recover the bubbles of gas that form in the installation I. However, it is not essential to use such chambers 12.

Figure 5:
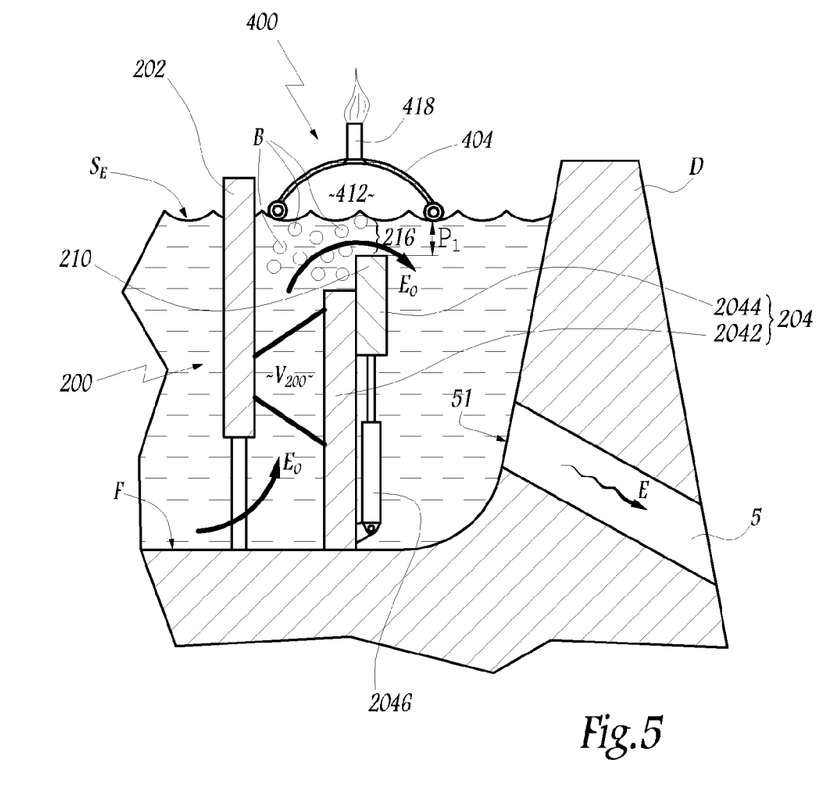
FIG. 5 is a view analogous to FIG. 2 for a second embodiment of an installation of the invention.

In the second embodiment of the invention shown in FIG. 5, the elements analogous to the elements of the first embodiment bear identical references.

In this embodiment, the downstream panel 204 is formed of a stationary portion 2042 held stationary in the impoundment of water R and of a moving portion 2044 controlled by an actuator 2046 mounted on the stationary portion 2042. The moving portion 2044 is mounted to be movable vertically relative to the stationary portion, as indicated by the double-headed arrow $F_1$, thereby making it possible to adjust the position of the top edge 210 of the panel 204 relative to the surface of the water $S_E$, so that a pre-established height can be maintained for the outlet passage 216 of the volume $V_{200}$. In other words, the depth $P_1$ at which the edge 210 is situated can be adjusted by means of the actuator 2046.

This makes it possible to take account of the height of water in the impoundment R, which height can vary as a function of precipitation. The shallower the depth $P_1$, the closer to the surface $S_E$ the flow $E_0$ must pass, and the more accentuated the formation of bubbles B becomes. However, the value $P_1$ is maintained greater than a minimum value so as not to cause turbulence that could adversely affect the efficiency of the installation.

The upstream panel 202 is stationary, and its top edge projects from the surface of the water $S_E$. It co-operates with the downstream panel 204 to define a volume $V_{200}$ in which a flow $E_0$ that is to enter the mouth 51 of the forced-flow duct 5 is constrained by the device 200 to flow in an upward movement, thereby causing bubbles of gas B to form, as in the first embodiment.

The raft 400 used in this embodiment is held stationary over the volume $V_{200}$ and is equipped with a flare stack 418 mounted on its cover 404, thereby making it possible to burn off the gases, such as methane, that migrate in the form of bubbles B towards the chamber 412 defined by the cover 404. Said gases are then destroyed by combustion and the gases resulting from said combustion (essentially $CO_2$) have less influence on the greenhouse effect than methane.

In a variant of the invention (not shown), the panel 202 may also be mounted to be vertically movable, at least in part. For example, the legs 206 may be telescopic or the panel 202 may be a floating panel that is guided vertically by a frame fastened to the bottom F. Its top edge nevertheless still projects from the surface $S_E$.

In the two embodiments described, means (not shown), such as mooring lines fastened to the panel 202, are provided to retain the raft 400 over the volume 200 and over the passage 216.

In a variant of the invention (not shown) means for collecting the gas bubbles generated by the upward movement of the flow $E_0$ inside the device 200 may be supported by the top portion of the panel 202, so that it is not necessary to use a raft.

Figure 6:
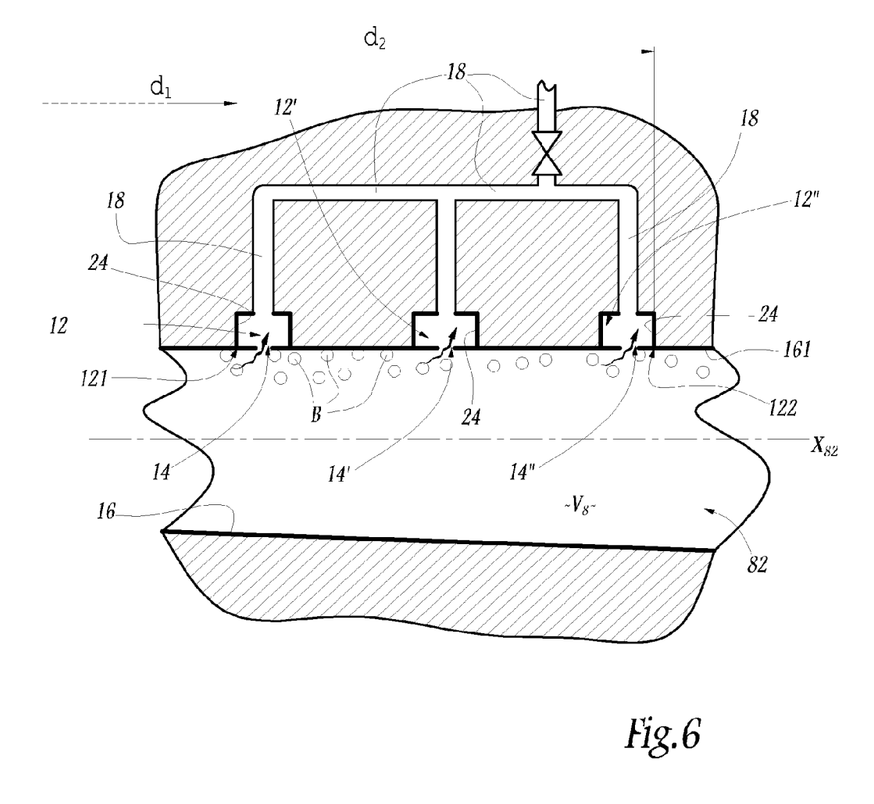
FIG. 6 is a view analogous to FIG. 3 for a third embodiment of an installation of the invention.

In the third embodiment of the invention shown in FIG. 6, elements analogous to the elements of the first embodiment bear like references.

Only that which distinguishes this embodiment from the preceding embodiment is described below.

In this embodiment, three chambers 12, 12', and 12" are distributed over the length of the downstream portion 82 of the duct 8, along the axis $X_{82}$. Each of these chambers is connected via an opening 14, 14', 14" to the top portion $S_8$ of the internal volume $V_8$ of the discharge duct 8 of the installation, so that they make it possible to collect the bubbles B of methane or of other greenhouse gases that are formed in said duct.

Each chamber 12 is defined by a steel shell 24 that is mounted in leaktight manner on the top portion 161 of the wall 16 of the duct 8.

The various chambers are interconnected via portions of a duct 18 that connects them collectively to a tank, such as the tank 20 of the first embodiment or to a treatment unit for treating the collected gases.

As in the first embodiment, references $d_1$ and $d_2$ designate the distances measured parallel to the axis $X_{82}$ between the axis of rotation of the wheel of the turbine and, respectively, the upstream edge 121 of the chamber 12 and the downstream edge 122 of the chamber 12. With the same references as for the first embodiment, the ratio $d_1/D_2$ is greater than 1, while the ratio $d_2/D_2$ is greater than 2 and greater than $d_1/D_2$.

In an embodiment (not shown), each of the chambers $12_1$, 12' or 12" may be connected to the internal volume $V_8$ of the duct 8 via a plurality of openings that are themselves distributed along the axis $X_{82}$.

Regardless of the embodiment in question, the structure comprising the device 200 and the raft 400 is relatively simple to implement, so that it can be used not only for new installations, but also for renovating existing installations.

The invention is not limited to installations including Francis turbines. It may be implemented in any installation including a turbine of some other type, e.g. a Kaplan turbine, or a bulb turbine, in which one or more gases dissolved in the water can be released due to a flow of water being forced through the turbine.

Other variants are also possible. Thus, the chamber 412 may be supported by a floating raft, while being immersed in the impoundment of water, thereby making it less sensitive to wind and waves than the chamber of FIG. 2. To this end, it suffices to place the floats 402 on top of the cover 404. In addition, when the invention is implemented for renovating an installation, the existing discharge duct may be extended to enable the gas collection chamber to be put into place. In a variant, the gas collection chamber may be formed by a bell-type device disposed at the outlet of the discharge duct, e.g. on a raft floating on the surface of the river, downstream from the installation, or fastened to the downstream end of the discharge duct.

The technical feature of the various variant embodiments considered may be combined without going beyond the ambit of the invention.

The invention claimed is:

1. An installation for converting hydraulic energy into mechanical or electrical energy, the installation comprising at least one hydraulic turbine, an impoundment of water, and a feed duct for feeding the turbine with water from the impoundment of water, wherein the installation further comprises:
    an immersed device including at least two horizontally spaced and vertically oriented panels disposed in the impoundment of water in such a manner as to constrain a flow of water advancing inside the impoundment of water towards a mouth of the feed duct to flow in an upward movement between the at least two panels to thereby release gases from the water before the water flows into the mouth of the feed duct;
    bracing rods that connect at least the two horizontally spaced and vertically oriented panels; and
    a gas collection raft disposed on a surface of the water over a portion of the immersed device in which the upward movement of the flow of water takes place.

2. The installation according to claim 1, wherein the at least two panels are vertically spaced relative to one another such that a bottom edge of an upstream one of the at least two panels relative to the flow of water within the impoundment of water is spaced above a bottom edge of a downstream one of the at least two panels to thereby define between the upstream and downstream panels a volume in which the upward movement of the flow of water takes place.

3. The installation according to claim 2, wherein the upstream panel of the at least two panels is spaced at a distance from the bottom of the impoundment of water, an inlet passage via which the flow of water enters the upward movement volume is formed between the bottom edge of the upstream panel and the bottom of the impoundment of water.

4. The installation according to claim 3, wherein the upstream panel projects above the surface of the impoundment of water.

5. The installation according to claim 3, wherein the downstream panel extends to the bottom of the impoundment of water, and wherein an outlet passage via which the flow of water exits from the upward movement flow within the volume between the upstream and downstream panels is provided between a top edge of a second panel and the surface of the impoundment of water.

6. The installation according to claim 2, wherein the upstream and downstream panels are mounted so as to be stationary within the impoundment of water.

7. The installation according to claim 2, wherein the upstream and downstream panels are mounted to be vertically movable within the impoundment of water.

8. The installation according to claim 1, wherein the gas collection raft includes a chamber formed by a concave structure that has a concave side facing towards a portion of the immersed device.

9. The installation according to claim 8, wherein the concave structure is a structure is supported on floats for floating the structure on the surface of the impoundment of water.

10. The installation according to claim 8, wherein the at least one gas collection chamber is connected to one of a tank and a flare stack for removing or for treating the collected gases.

11. The installation according to claim 1, including a discharge duct through which a flow of water can flow downstream from the turbine, and wherein at least one gas collection chamber is in fluid communication with the internal volume of the duct.

12. The installation according to claim 11, wherein at least one gas collection chamber is in fluid communication with a top zone of the internal volume of the duct in a substantially horizontal portion of the duct, wherein the at least one chamber is connected to the internal volume of the duct via at least one opening that is parallel to a longitudinal axis of the substantially horizontal portion of the duct, and wherein the at least one gas collection chamber is defined by a shell that is mounted on a top portion of a wall of the duct and that is connected to the top portion in a leak tight manner.

13. The installation according to claim 12, wherein the at least one gas collection chamber is a single chamber and is connected to the internal volume of the duct via a plurality of openings.

14. The installation according to claim 12, wherein a plurality of gas collection chambers are distributed over a length of the substantially horizontal portion of the duct, and each of the plurality of gas collection chambers is connected via at least one opening to the internal volume of the duct.

15. The installation according to claim 12, wherein a first ratio between firstly a distance, measured parallel to a central axis of the horizontal portion of the duct, between an axis of rotation of a wheel of the hydraulic turbine and an upstream edge of an upstream-most opening of the at least one gas collection chamber, and secondly a diameter of the wheel is greater than 1, and wherein a second ratio between firstly the distance, measured parallel to a central axis, between the axis of rotation of the wheel and a downstream edge of the downstream-most opening of the at least one gas collection chamber, and secondly the diameter of the wheel is greater than 2.

16. The installation according to claim 15, wherein the first ratio is equal to 2 and the second ratio is equal to 3.

17. The installation according to claim 11, wherein the at least one gas collection chamber is connected via a duct to a gas accumulation tank.

18. The installation according to claim 11, wherein the at least one gas collection chamber is connected to one of a tank and a flare stack for removing or for treating the collected gases.

19. The installation according to claim 11, wherein the at least one gas collection chamber is connected via a duct to a treatment unit for treating the gases collected in the chamber.

20. The installation according to claim 1, wherein the bracing rods are between the two panels.

\* \* \* \* \*